United States Patent [19]

Tanaka et al.

[11] Patent Number: 4,915,674
[45] Date of Patent: Apr. 10, 1990

[54] TOOTHED DRIVE BELT

[75] Inventors: Hiroyuki Tanaka, Hyogo; Hideo Hirai, Kakogawa; Kazumi Kawai, Hyogo; Tsuneo Shaura, Hyogo, all of Japan

[73] Assignee: Mitsuboshi Belting Ltd., Kobe, Japan

[21] Appl. No.: 222,629

[22] Filed: Jul. 21, 1988

[30] Foreign Application Priority Data

Sep. 14, 1987 [JP] Japan ............... 62-231688

[51] Int. Cl.$^4$ .................. F16G 1/28; F16G 7/02
[52] U.S. Cl. .................. 474/153; 474/205
[58] Field of Search .......... 474/152, 153, 204, 205, 474/202

[56] References Cited

U.S. PATENT DOCUMENTS

| | | | |
|---|---|---|---|
| 3,756,091 | 9/1973 | Miller | 74/231 C |
| 3,924,481 | 12/1975 | Gregg | 74/231 C |
| 4,108,011 | 8/1978 | Gregg et al. | 74/229 |
| 4,148,225 | 4/1979 | Redmond, Jr. et al. | 43/243 R |
| 4,468,211 | 8/1984 | Hoshiro et al. | 474/205 |
| 4,515,577 | 5/1985 | Cathey et al. | 474/204 |
| 4,586,915 | 5/1986 | Cathey et al. | 474/153 X |
| 4,604,080 | 8/1986 | Mizuno | 474/153 |

FOREIGN PATENT DOCUMENTS 58-38187   6/1983   Japan .

*Primary Examiner*—Thuy M. Bui
*Attorney, Agent, or Firm*—Wood, Phillips, Mason Recktenwald & Vansanten

[57] ABSTRACT

A belt drive having a belt provided with longitudinally spaced teeth arranged to have a preselected clearance between the side flanks thereof and the side flanks of pulley teeth with which the belt teeth are meshed in a driving operation. The clearance is caused to be a maximum at the belt tooth tips and decrease to a minimum or zero at the belt tooth roots. Different belt tooth side flank curvatures are disclosed wherein the curvatures are centered on axes located at different locations relative to the belt body. The locations of the pulley tooth flank curvature axes are related to the positions of the belt tooth flank curvature axes and a number of different relative positions thereof are disclosed.

32 Claims, 3 Drawing Sheets

TOOTHED DRIVE BELT

TECHNICAL FIELD

This invention relates to toothed belt drives and in particular to toothed belt drives wherein minimized backlash is a desideratum.

BACKGROUND ART

Toothed belt drives are utilized in a wide range of applications where accurate positioning of a driven element by means of a belt drive is required. Thus, such belt drives are used in operating printing mechanisms of typewriters, computer printers, etc. A number of different forms of such belt drives have been developed in an effort to provide such desired accuracy of positioning. In effecting such accuracy, the backlash between the belt teeth and the pulley teeth is a critical factor. The present invention is concerned with an improved structural configuration of such a toothed belt drive providing improved control of the backlash in such a manner as to afford optimum accuracy in the positioning of the driven element.

The belt tooth configuration may vary from a conventional trapezoidal cross section to one wherein the flank surfaces of the belt tooth are arcuate.

Where the belt teeth have arcuate flanks, it is conventional to provide similar arcuate flanks to the pulley teeth.

It has been conventional to construct the belt and pulley teeth so as to provide a backlash between the teeth so as to be substantially equal over the length of the tooth flanks. Alternatively, it has been conventional to provide an increased backlash clearance at the root of the belt teeth so as to provide a smooth engagement of the belt with the pulley.

Such belts are conventionally formed of elastomeric material and a stretching of the belt occurs at times, such as during start-up of the drive. Under such conditions, the belt tooth surface tends to be frictionally rubbed against the pulley and undesirable wear thereof occurs. This problem is particularly vexatious where the drive systems utilize relatively small diameter pulleys, or where repetitive reversal of the drive operation is effected.

Further, by providing a relatively large backlash, it is difficult to accurately position the driven mechanism, such as the carriage of the printing mechanism, which is installed on the toothed belt under relatively low tension.

While gear and chain drives have been used in the past for such applications, the use of flexible toothed transmission belt drive systems is becoming more common in view of the low noise levels and avoidance of lubrication requirements thereof.

Where clearance is provided between the root of the belt tooth and the tip of the pulley tooth to permit smooth engagement of the toothed belt with the pulley, it is difficult to accurately position the pulley and associated mechanism. One attempted solution to this problem is to place the belt under relatively high tension. This, however, has the disadvantage of subjecting the pulley shaft to substantial forces and requires a greater power in the operation of the drive system. On the other hand, reducing the clearance between the belt tooth and pulley tooth to provide improved accuracy and positioning has been found to cause undesirable increased wear as a result of difficulty in effecting a smooth engagement therebetween in the operation of the drive. Thus, the belt teeth become stabilized only after being fully deformed by their engagement with the pulley teeth and because of the dynamic resilient characteristics of the belt, the belt teeth are substantially removed from the pulley groove before the stable condition occurs.

Thus, there has been a longstanding vexatious problem of effecting smooth engagement and disengagement of the belt teeth relative to the pulley teeth, while yet assuring accurate positioning of the pulley by elimination of undesirable clearance therebetween, permitting backlash between the belt and pulley.

DISCLOSURE OF THE INVENTION

The present invention comprehends an improved belt drive wherein the belt teeth have smooth force transfer transition relative to the pulley teeth in coming into engagement and leaving engagement therewith during operation of the drive. The invention comprehends the provision of such a belt drive wherein accurate positioning of the pulley is obtained by a positive clearance-free engagement of a portion of the belt tooth with the pulley tooth.

More specifically, the invention comprehends the provision in a belt drive having a toothed pulley and a cooperating toothed belt, the pulley defining a circumferential array of pulley teeth separated by intermediate grooves, each defining a bottom, each of the pulley teeth defining a tooth tip and opposite side flanks extending inwardly from the pulley tooth tip into the pulley grooves, the belt defining a plurality of longitudinally spaced belt teeth separated by intermediate belt grooves, the belt teeth being adapted to be received selectively in the pulley grooves, with each of the belt teeth defining a tooth tip and opposite side flanks extending outwardly from the belt tooth tip into the belt groove. The belt tooth flanks, in the present invention, are right circularly cylindrical, centered on a first axis transverse to the belt, and the pulley teeth flanks are right circularly cylindrical and are centered on a second axis transverse to the belt which is spaced from the location of the first axis when the belt tooth is fully received in the pulley groove in a static association thereof. The location of the second axis and the configuration of the belt teeth and pulley grooves is preselected to cause the flanks of the belt teeth to engage the pulley groove flanks at the outer end of the pulley flanks only and become gradually increasingly spaced from the pulley tooth flanks inwardly from adjacent the outer end of the pulley groove flanks to adjacent the inner end of the pulley groove.

In the illustrated embodiment, the belt tooth tip is spaced outwardly of the bottom of the pulley grooves when the belt tooth is fully received therein.

The invention comprehends that the pulley axis be spaced from the belt axis and, illustratively, may be spaced inwardly or longitudinally thereof.

In one form, the belt defines an outer surface and the belt axis is at the outer surface, the pulley axis being spaced inwardly thereof.

The invention comprehends that one or more of the axes be outwardly aligned with the outer end of the belt flank.

The invention comprehends that one or more of the axes be disposed outwardly of the outer tip of the pulley teeth.

In one form of the invention, one or more of the axes is located on the pitch line of the belt.

A clearance may be provided at the inner end of the belt tooth relative to the confronting pulley tooth surface of approximately 0.04 mm. The clearance may gradually increase inwardly from the root portion of the belt tooth so as to have a clearance of approximately 0.02 mm., with the pulley tooth flank at the midportion of the belt tooth.

The invention comprehends that the radius of the cylindrical belt tooth flanks be substantially equal to the width of the belt teeth at the root portion thereof.

In one form, the belt axis is located on the outer surface of the belt, and the pulley tooth axis is located inwardly of the pitch line of the belt.

The invention comprehends that the spacing of the belt axes from the centerline of the tooth is in the range of approximately 0.475 to 0.525 times the pitch of the belt teeth. The length of the radii from the belt axes to the belt tooth cylindrical flanks at the midportion thereof is in the range of approximately 70 to 85% of the spacing between the axes at opposite sides of the belt tooth centerline.

The arcuate pulley tooth flanks, in the illustrated embodiment, are right circularly cylindrical.

The belt drive of the present invention is extremely simple and economical of construction, while yet providing long, troublefree life and accurate positioning of the driven mechanism in a novel and simple manner.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
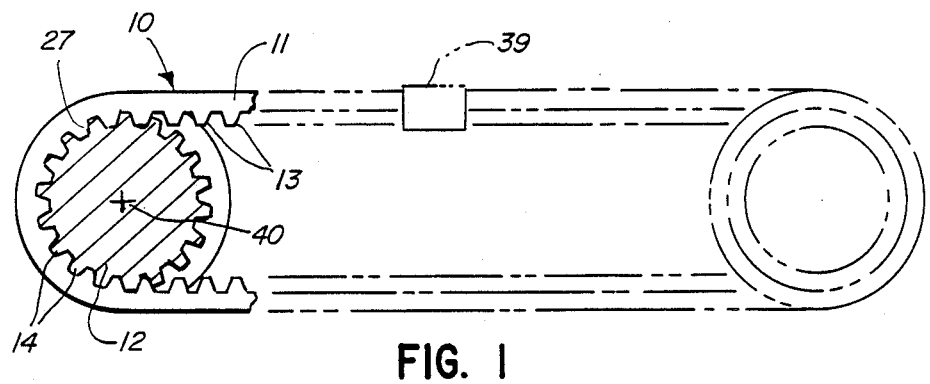
FIG. 1 is a side elevation of a drive system shown partially in broken lines, illustrating the cooperating toothed belt and pulley structure embodying the invention.

In the illustrative embodiment of the invention as disclosed in FIGS. 1–4, a belt drive generally designated 10 includes a toothed belt 11 and a cooperating toothed pulley 12.

The present invention is concerned with the construction of the cooperating belt teeth 13 and pulley teeth 14 for providing a smooth engagement and disengagement of the belt teeth relative to the pulley during operation of the drive, with effectively minimized backlash between the belt teeth and pulley teeth when the belt teeth are fully meshed with the pulley in the operation of the drive.

Toothed belt 11 is preferably formed of an elastomeric material, such as rubber, and includes a body portion 15 defining a pitch line 16. A conventional tensile cord 17 may be provided at the centerline.

Belt body 15 defines an outer surface 18 and an inner surface 19.

Belt teeth 13 are provided in a longitudinally extending spaced array at a pitch P. Each tooth 13 defines a tooth width W, which is the maximum longitudinal extent of the tooth at the root portion 20 thereof.

Each belt tooth 13 further defines side flanks 21 and 22 extending inwardly from root portion 20 to a tooth tip 23. Each side flank defines a midportion 24 midway between the root portion 20 and tip 23, as seen in FIG. 2.

Figure 2:
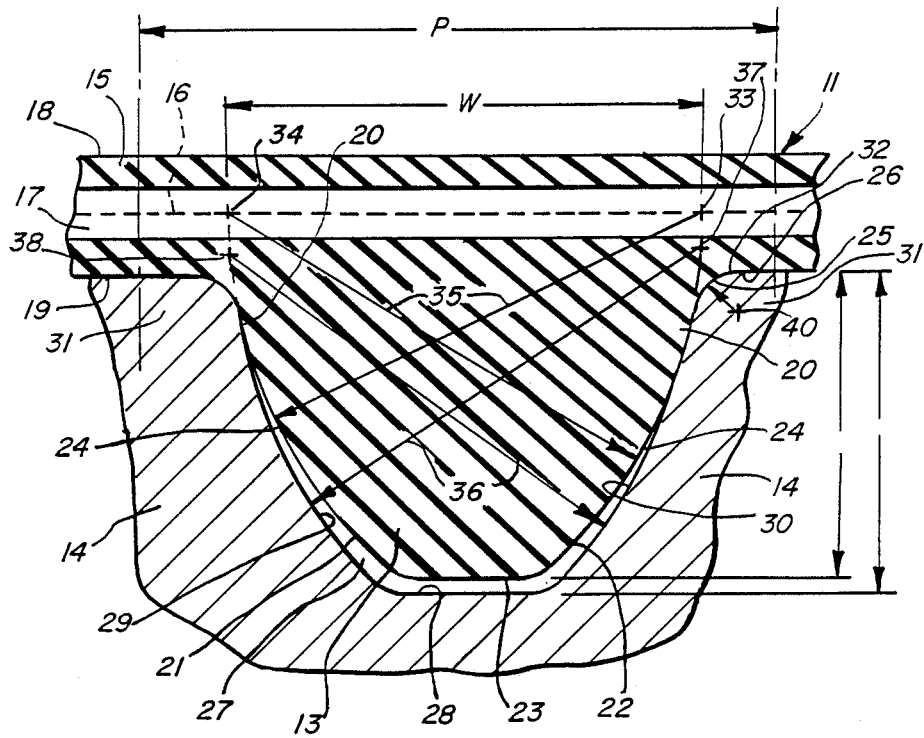
FIG. 2 is a fragmentary longitudinal section illustrating in greater detail the structure of the toothed belt and pulley.
Figure 3:
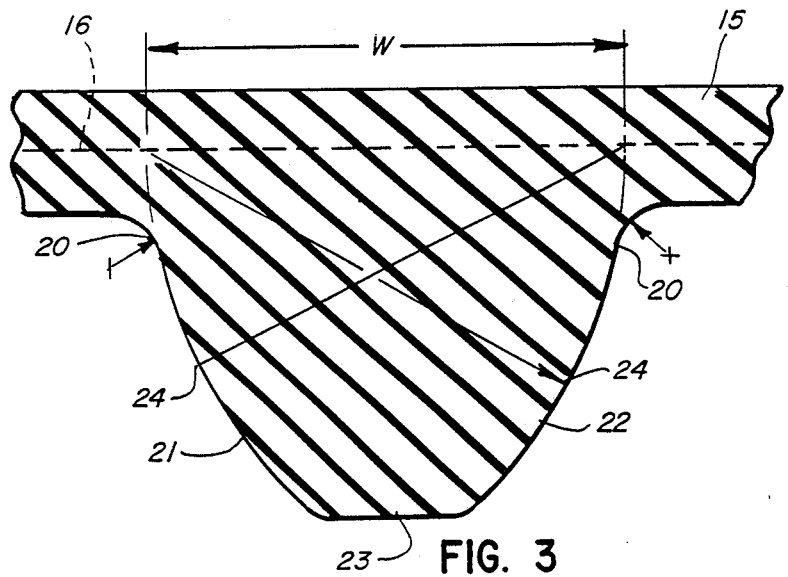
FIG. 3 is a fragmentary longitudinal section of a belt tooth thereof.
Figure 4:
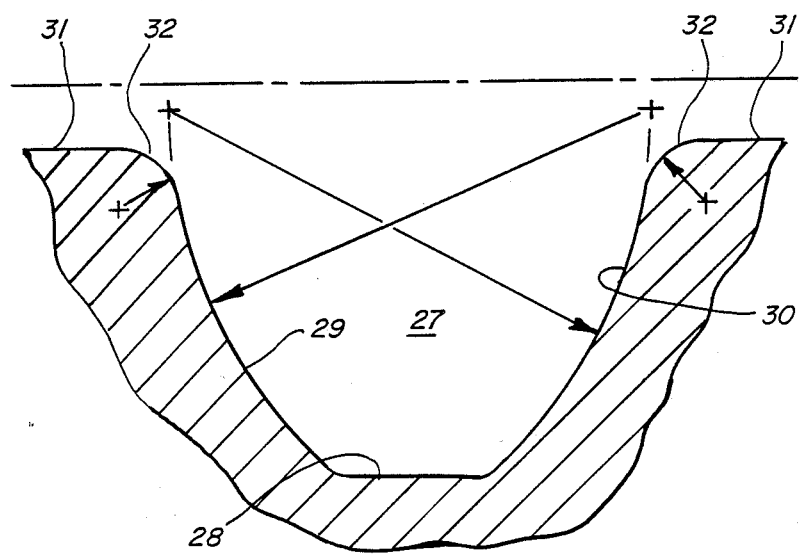
FIG. 4 is a longitudinal section of a pulley embodying the invention.

As further illustrated, the pulley teeth merge into the belt body inner surface 19 at a radius 25, whereby the grooves 26 between the belt teeth embrace the pulley teeth 14, as shown in FIG. 2.

As illustrated in FIG. 1, pulley teeth 14 are arranged in a circumferential array about the axis 40 so as to define therebetween a series of intervening pulley grooves 27. The pulley grooves define a bottom surface 28, as shown in FIG. 2, and the confronting flank surfaces 29 and 30 of the adjacent teeth extend outwardly from groove bottom surface 28 to a pulley tooth tip 31. The pulley tooth tip is provided with a radius 32 blending into the flank pulley tooth.

The invention comprehends a novel construction of the belt and pulley so as to provide an improved positive engagement of the belt teeth with the pulley teeth in the meshed relationship thereof, as illustrated in FIG. 2, while providing for facilitated entry and withdrawal of the belt teeth into the pulley grooves for positive positioning of the pulley, with the belt maintained at relatively low tension.

More specifically, the invention comprehends forming the flank surfaces 21 and 22 of the belt teeth as right circularly cylindrical surfaces centered on axes, or centers of curvature, 33 and 34, respectively. Axis 33 is located on the pitch line 16, and the length of radius 35 from axis 33 to the center point 24 of the belt tooth flank 21 is preselected so as to provide a clearance between point 24 and the pulley tooth flank 29 of approximately 0.04 mm. In the illustrated embodiment, a minimal clearance between the belt tooth flank and the confronting pulley tooth flank at the root portion 20 of the belt tooth is approximately 0.02 mm.

As shown in FIG. 2, the maximum clearance occurs between the belt tooth flanks and the pulley tooth flanks at the tip 23 of the belt tooth, which, as illustrated, is preferably spaced outwardly of the bottom 28 of the pulley grooves in the meshed association of the belt teeth with the pulley.

The invention comprehends that the pulley tooth flanks may be engaged with the pulley tooth flanks at root portion 20 of the belt tooth. More specifically, the invention comprehends that the belt tooth flanks be juxtaposed to the pulley tooth flanks at the root of the belt teeth and a clearance be provided which gradually increases from the juxtaposed flanks at outer portion 20 to a maximum at the distal end 23 of the belt tooth.

In the illustrated embodiment, the clearance at the midportion 24 of approximately 0.04 mm. increases as a direct function of the distance from root portion 20.

In the illustrated embodiment, the pulley tooth flank surfaces 29 and 30 are right circularly cylindrical, it being understood that they may comprise surfaces defined by substantially cylindrical parabolic or elliptical surfaces.

In the illustrated embodiment, the belt tooth flank radius 35 is substantially equal to the belt tooth thickness W.

The pulley tooth flank surfaces 29 and 30 are defined by radii 36 drawn from axes, or centers of curvature, 37 and 38 disposed inwardly of axes 33 and 34, respectively, within body 15. Radii 36 may have a length approximately equal to radii 35 and, in the illustrated embodiment, have a length slightly greater than the length of radii 35.

The inner surface of the belt 11 defining the belt teeth 13 and intermediate grooves may be covered with a cloth fabric, as desired. The mechanism intended to be positioned, such as carriage 39, is preferably mounted to the belt on the outer surface 18 thereof. In the illustrated embodiment, pulley 12 defines the drive pulley of the system. Thus, the mechanism to be positioned is mounted most remotely from the portion of the system defining the maximum backlash, i.e. adjacent the belt tooth tip 23.

Thus, in use, the belt drive system 10 provides long, troublefree life of the belt, while yet assuring effectively positive positioning of the belt and mechanism carried thereby as a result of the novel inwardly increasing clearance from the minimum at the belt tooth root 20.

Thus, facilitated engagement and disengagement of the belt relative to the pulley is provided, while yet assuring long, troublefree life thereof and accurate positioning of the mechanism 39 in the use of the drive system.

Figure 5:
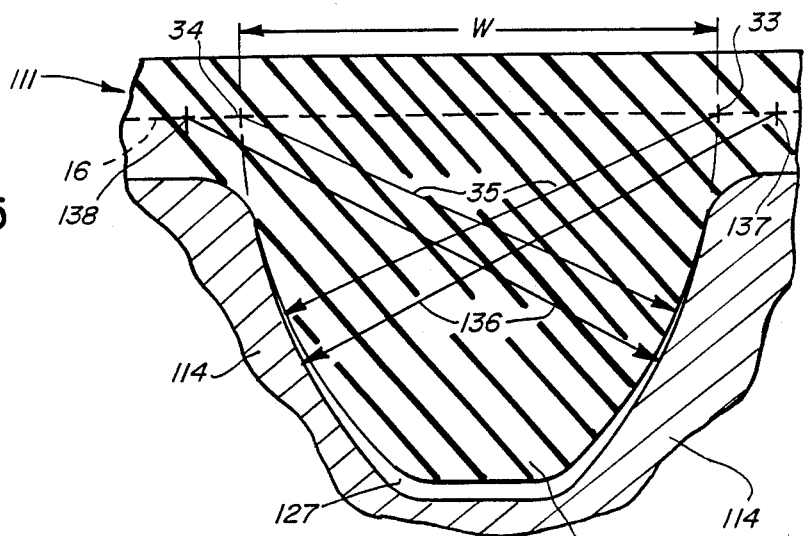
FIG. 5 is a longitudinal section illustrating a modified form of belt drive embodying the invention.
Figure 6:
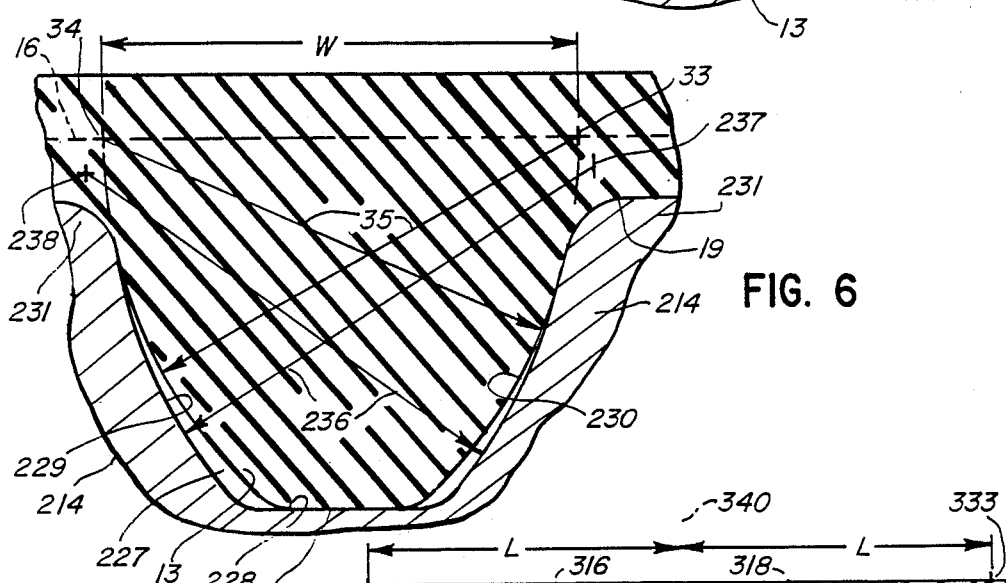
FIG. 6 is a longitudinal section illustrating still another form of belt drive embodying the invention.
Figure 7:
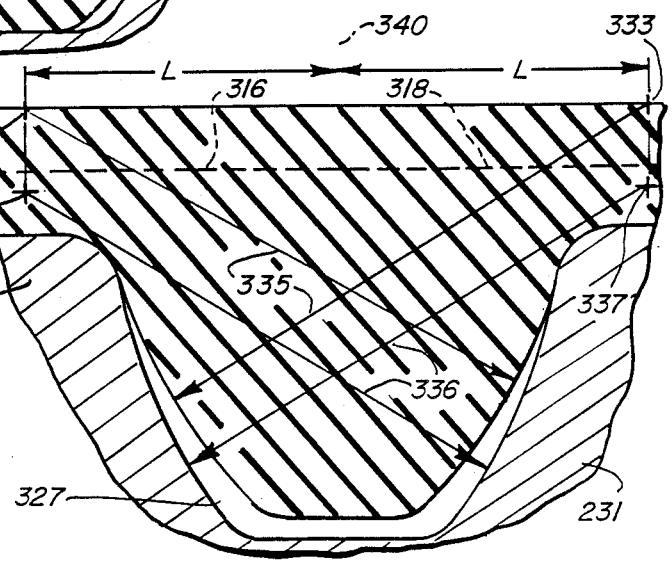
FIG. 7 is a longitudinal section illustrating yet another form of belt drive embodying the invention.

Other forms of the improved belt drive system of the present invention are illustrated in FIGS. 5, 6 and 7. Thus, as shown in FIG. 5, the belt tooth 13 may be utilized with a modified form of pulley tooth 114, which differs from pulley tooth 14 in that the radii 136 extend from axes, or centers of curvature 137 and 138, respectively, disposed axially outwardly of the axes 33 and 34, rather than inwardly thereof as in belt 11. Thus, radius 136 is larger than radius 35 and also larger than radius 36 of belt 11.

Another form of belt drive embodying the invention is illustrated in FIG. 6, wherein the tooth flank axes 237 and 238 are displaced both longitudinally outwardly of and transversely inwardly of the belt flank axes 33 and 34, respectively.

As further illustrated in FIG. 6, pulley groove bottom surface 228 may be in engagement with tooth tip 23. As shown, the tooth flank radii 236 may be approximately equal to the belt flank radii 35.

Thus, as seen in FIG. 6, the belt flank axes 33 and 34 may be aligned outwardly with the outer end of the tooth flanks 229 and 230, whereas the pulley tooth flank axes 237 and 238 are disposed outwardly of the pulley tooth tips 231 intermediate the pitch line 16 and the inner surface 19 of the belt body.

Yet another embodiment of the invention is disclosed in FIG. 7, wherein the belt tooth flank axes 333 and 334 are disposed on the outer surface 318 of the belt. Further, the axes 333 and 334 are disposed outwardly of the pulley tooth tips 231, rather than in alignment with the outer end of the pulley tooth flanks, as in the above described embodiments. Pulley tooth axes 337 and 338 are disposed transversely inwardly of axes 333 and 334 and inwardly of the pitch line 316.

More specifically, as shown in FIG. 7, the axes 333 and 334 are spaced at opposite sides of the centerline 340 of the belt tooth a distance L, which is preferably approximately 0.475 to 0.525 times the pitch of the belt teeth. The radii 335 of the belt tooth flanks from axes 333 and 334 is approximately 1.4 to 1.7 L. The pulley tooth flank radii 336, as shown, are slightly shorter than the belt tooth flank radii 335.

In each of the embodiments of FIGS. 5, 6 and 7, a clearance is provided between the side flanks of the belt teeth and the confronting side flanks of the pulley teeth, which is at a maximum at the tip end of the belt teeth and which decreases to a minimum or zero at the root of the pulley teeth. As discussed above relative to belt drive 10, the maximum clearance between the belt tooth flank and pulley tooth flank at the root of the belt tooth is 0.02 mm., permitting the belt and pulley to be engaged and disengaged smoothly in the operation of the drive in all embodiments of the invention.

Further, in each of the embodiments, the clearance at the midpoint of the belt tooth flanks is no more than approximately 0.04 mm.

In each of the embodiments, the pulley groove flanks may be right circularly cylindrical, parabolic, or elliptical, as desired.

The length of the belt teeth is preferably no greater than the height of the pulley grooves so as to avoid compressive interference between the belt teeth and pulley grooves in the operation of the drive.

Portions of the belt drives of FIGS. 5, 6 and 7 corresponding to portions of the belt drive of FIGS. 1–4 are identified by similar reference numerals, but progressively 100 higher. Except for the differences discussed above, each of the belt drives is similar and functions in a similar manner in providing the highly improved, long, troublefree life and accurate positioning features discussed above.

By providing the backlash clearance to be a maximum at the point most remote from the portion of the belt carrying the mechanism to be positioned, the positioning of the mechanism is effected in main by the portion of the belt tooth having minimum or zero clearance with the pulley tooth. Thus, improved accurate positioning of the mechanism is assured, while yet the substantial clearance at the distal end of the belt teeth relative to the pulley teeth assures smooth engagement and disengagement of the belt teeth relative to the pulley in the operation of the drive. As the configuration of the belt and pulley teeth is symmetrical about the axes thereof, the improved, positive positioning and facilitated engagement and disengagement is effected in either direction of movement of the belt in effecting the positioning of the mechanism 39.

The improved construction of the belt teeth, as disclosed, permits the belt to be utilized with small diameter pulleys, while yet providing the highly desirable features discussed above therewith. The improved belt drive system of the invention has been found to produce reduced belt tooth distortion in the operation of the drive, thereby providing further improved accuracy in the positioning of the mechanism being positioned thereby.

It has further been found that the improved construction of the present invention results in less shear stress being applied to the belt tooth root, thereby minimizing cracks and improving the gripping force between the belt tooth root and pulley tooth tip so as to minimize belt jumping in the operation of the drive. High belt stability in the low tension portions of the belt have proven the belt drive system of the present invention highly advantageous in providing positioning belt drive means in business machines requiring high positional accuracy of the driven mechanism.

The foregoing disclosure of specific embodiments is illustrative of the broad inventive concepts comprehended by the invention.

We claim:

1. In a belt drive having a toothed pulley and a cooperating toothed belt,
    said pulley defining a circumferential array of pulley teeth separated by intermediate grooves each defining a bottom,
    each said pulley tooth defining a tooth tip and opposite side flanks extending inwardly from said tip into said pulley grooves,
    each said pulley flank having a height,
    said belt defining a plurality of longitudinally spaced belt teeth separated by intermediate belt grooves,
    said belt teeth being adapted to be received selectively in said pulley grooves,
    each belt tooth defining a tooth tip and opposite side flanks extending outwardly from said belt tooth tip into said belt grooves,
    said belt tooth flanks each having a height and an arcuate configuration traced by an arc centered on a first axis transverse to the belt substantially the entire belt tooth flank height,
    said pulley tooth flanks being arcuate and traced by an arc centered on a second axis transverse to the belt over substantially the entire height of the pulley tooth flank,
    said second axis being spaced from the location of said first axis when the belt tooth is fully received in said pulley groove,
    said location of said second axis and the configuration of said belt teeth and pulley grooves being preselected to cause the flanks of the belt teeth to be juxtaposed to said pulley tooth flanks at the other end of the belt tooth flanks and become gradually increasingly spaced from the pulley tooth flanks inwardly from adjacent said outer end of the belt tooth flanks to adjacent the bottom of the pulley groove.

2. The belt drive of claim 1 wherein said belt tooth tip is spaced outwardly of said bottom of the pulley groove when the belt tooth is fully received in said pulley groove.

3. The belt drive of claim 1 wherein said second axis is spaced inwardly of said first axis.

4. The belt drive of claim 1 wherein said second axis is spaced longitudinally of said first axis.

5. The belt drive of claim 1 wherein said second axis is spaced inwardly and longitudinally of said first axis.

6. The belt drive of claim 1 wherein said belt defines an outer surface and said first axis is at said outer surface.

7. The belt drive of claim 1 wherein said belt defines an outer surface and said first axis is at said outer surface and said second axis is spaced inwardly thereof.

8. The belt drive of claim 1 wherein said second axis is spaced inwardly of said first axis toward said outer end of the pulley groove.

9. The belt drive of claim 1 wherein said second axis is spaced longitudinally of said first axis and is disposed outwardly of said pulley tooth tip.

10. The belt drive of claim 1 wherein said first axes are outwardly aligned with said outer ends of the pulley groove flanks.

11. The belt drive of claim 1 wherein said first axes are outwardly aligned with said pulley tooth tips.

12. The belt drive of claim 1 wherein said second axes are outwardly aligned with said outer end of the pulley groove flanks.

13. The belt drive of claim 1 wherein said second axes are outwardly aligned with said pulley tooth tips.

14. The belt drive of claim 1 wherein said first and second axes are outwardly aligned with said outer end of the pulley groove flanks.

15. The belt drive of claim 1 wherein said first and second axes are outwardly aligned with said pulley tooth tips.

16. The belt drive of claim 1 wherein said first axes are outwardly aligned with said pulley tooth tips and said second axes are outwardly aligned with said pulley tooth tips.

17. The belt drive of claim 1 wherein the spacing between said belt tooth flanks and the pulley tooth flanks is approximately 0.04 mm. at the inner end of the groove.

18. The belt drive of claim 1 wherein the spacing between said belt tooth flanks and the pulley tooth flanks is approximately 0.04 mm. at the inner end of the groove and approximately 0.02 mm. at a midportion of said belt and pulley tooth flanks.

19. The belt drive of claim 1 wherein each belt tooth defines a root portion and the radius of the cylindrical belt tooth flanks is substantially equal to the width of the belt tooth at said root portion.

20. The belt drive of claim 1 wherein said pulley tooth flanks are right circularly cylindrical.

21. The belt drive of claim 1 wherein said belt teeth flanks are right circularly cylindrical.

22. The belt drive of claim 1 wherein said pulley and belt tooth flanks are right circularly cylindrical.

23. In a belt drive having a toothed pulley and a cooperating toothed belt,
    said pulley defining a circumferential array of pulley teeth separated by intermediate grooves each defining a bottom,
    each said pulley tooth defining a tooth tip and opposite side flanks extending inwardly from said tip into said pulley grooves,
    said belt defining a pitch line and a plurality of longitudinally spaced belt teeth separated by intermediate belt grooves,
    said belt teeth being adapted to be received selectively in said pulley grooves,
    each belt tooth defining a tooth tip and opposite side flanks extending outwardly from said belt tooth tip into said belt grooves,
    said belt tooth flanks each having a height and an arcuate configuration traced by an arc centered on a first axis transverse to the belt over substantially the entire belt tooth flank height,
    said pulley tooth flanks each having a height and an arcuate configuration traced by an arc centered on a second axis transverse to the belt over substantially the entire pulley tooth flank height,
    said second axis being spaced from the location of said first axis when the belt tooth is fully received in said pulley groove,
    said location of said second axis and the configuration of said belt teeth and pulley grooves being preselected to cause the flanks of the belt teeth to be juxtaposed to said pulley tooth flanks at the outer end of the belt tooth flanks and become gradually increasingly spaced from the pulley tooth flanks inwardly from adjacent said outer end of the belt tooth flanks to adjacent the bottom of the pulley groove, at least one of said axes intersecting said pitch line.

24. The belt drive of claim 23 wherein said first axes intersect said pitch line.

25. The belt drive of claim 23 wherein the spacing between said belt tooth flanks and the pulley tooth flanks is approximately 0.04 mm. at the inner end of the groove.

26. The belt drive of claim 23 wherein said second axes intersect said pitch line.

27. The belt drive of claim 23 wherein the spacing between said belt tooth flanks and the pulley tooth flanks is approximately 0.04 mm. at the inner end of the groove and approximately 0.02 mm. at a midportion of said belt and pulley tooth flanks.

28. The belt drive of claim 23 wherein both of said first and second axes intersect said pitch line.

29. The belt drive of claim 23 wherein each belt tooth defines a root portion and the radius of the cylindrical belt tooth flanks is substantially equal to the width of the belt tooth at said root portion.

30. The belt drive of claim 23 wherein said first axes are spaced outwardly of said pitch line.

31. The belt drive of claim 23 wherein said second axes are spaced inwardly of said pitch line.

32. The belt drive of claim 23 wherein said first axes are spaced outwardly of said pitch line and said second axes are spaced inwardly of said pitch line.

* * * * *